(12) United States Patent
Higuchi

(10) Patent No.: US 12,473,259 B2
(45) Date of Patent: Nov. 18, 2025

(54) ANHYDROUS CRYSTAL OF MONOSODIUM N-(2-ETHYLSULFONYLAMINO-5-TRIFLUOROMETHYL-3-PYRIDYL) CYCLOHEXANE CARBOXAMIDE

(71) Applicant: ISHIHARA SANGYO KAISHA, LTD., Osaka (JP)

(72) Inventor: Koji Higuchi, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 1039 days.

(21) Appl. No.: 17/611,293

(22) PCT Filed: May 15, 2020

(86) PCT No.: PCT/JP2020/019382
§ 371 (c)(1),
(2) Date: Nov. 15, 2021

(87) PCT Pub. No.: WO2020/230876
PCT Pub. Date: Nov. 19, 2020

(65) Prior Publication Data
US 2022/0306582 A1  Sep. 29, 2022

(30) Foreign Application Priority Data
May 15, 2019  (JP) .................................. 2019-092309

(51) Int. Cl.
*C07D 213/76*  (2006.01)
*A61K 9/00*  (2006.01)

(52) U.S. Cl.
CPC .......... *C07D 213/76* (2013.01); *A61K 9/0053* (2013.01); *C07B 2200/13* (2013.01)

(58) Field of Classification Search
CPC .. C07D 213/76; A61K 9/0053; A61K 9/0056; A61K 9/006; A61K 9/0095; A61K 9/20; C07B 2200/13; A61P 29/00; A61P 43/00
See application file for complete search history.

(56) References Cited

U.S. PATENT DOCUMENTS 6,197,796 B1 *  3/2001  Ogura ..................... A61P 35/00
514/336

FOREIGN PATENT DOCUMENTS

| EP | 0465913 A2 | 1/1992 |
|---|---|---|
| JP | H06263735 A | 9/1994 |
| JP | 2762323 B2 | 6/1998 |
| WO | 199837887 A1 | 9/1998 |
| WO | 01/56568 A1 | 8/2001 |

(Continued)

OTHER PUBLICATIONS

Conner, S., Glaxo chief: Our drugs do not work on most patients, The Independent (Year: 2003).*

(Continued)

*Primary Examiner* — Adam C Milligan
*Assistant Examiner* — Jason Nolan
(74) *Attorney, Agent, or Firm* — Banner & Witcoff, Ltd.

(57) ABSTRACT

The present invention provides a novel crystal of monosodium N-(2-ethylsulfonylannino-5-trifluoronnethyl-3-pyridyl)cyclohexane carboxamide that has a high density, particularly a high bulk density and/or tapped density, and that is suitable for formulation. More specifically, provided is an anhydrous crystal of monosodium N-(2-ethylsulfonylannino-5-trifluoronnethyl-3-pyridyl)cyclohexane carboxamide.

19 Claims, 9 Drawing Sheets

(56) References Cited

FOREIGN PATENT DOCUMENTS

| | | |
|---|---|---|
| WO | 01/56569 A1 | 8/2001 |
| WO | 01/56570 A1 | 8/2001 |
| WO | 2010/137484 A1 | 12/2010 |

OTHER PUBLICATIONS

Jurczak et al., Pharmaceutics, 12, 959, p. 1â25 (Year: 2020).*
Nov. 25, 2022 (EP) Extended European Search Report Application No. 20806648.0.
Jan. 26, 2024 (JP) Office Action Japanese Patent Application No. 2021-519496 with an English machine translation.
Kimura et al.. "Synthesis and Antipancreatitis Activities of Novel N-(2-Sulfonylamino-5-trifluoromethyl-3-pyridyl) carboxamide Derivatives as Phospholipase A2 Inhibitors" Chemical and Pharmaceutical Bulletin 43(10) 1696-1700, 1995.
Ashizawa et al., "Polymorphism and crystallization of the pharmaceutical drugs".
Nov. 1, 20216 (WO) International Preliminary Report on Patentability PCT/JP2020/019382.
Jul. 2, 20201 (WO) International Search Report PCT/JP2020/019382.
Mar. 11, 2024 (TW) Taiwan Office Action Application No. 109116167 with an English machine translation.

* cited by examiner

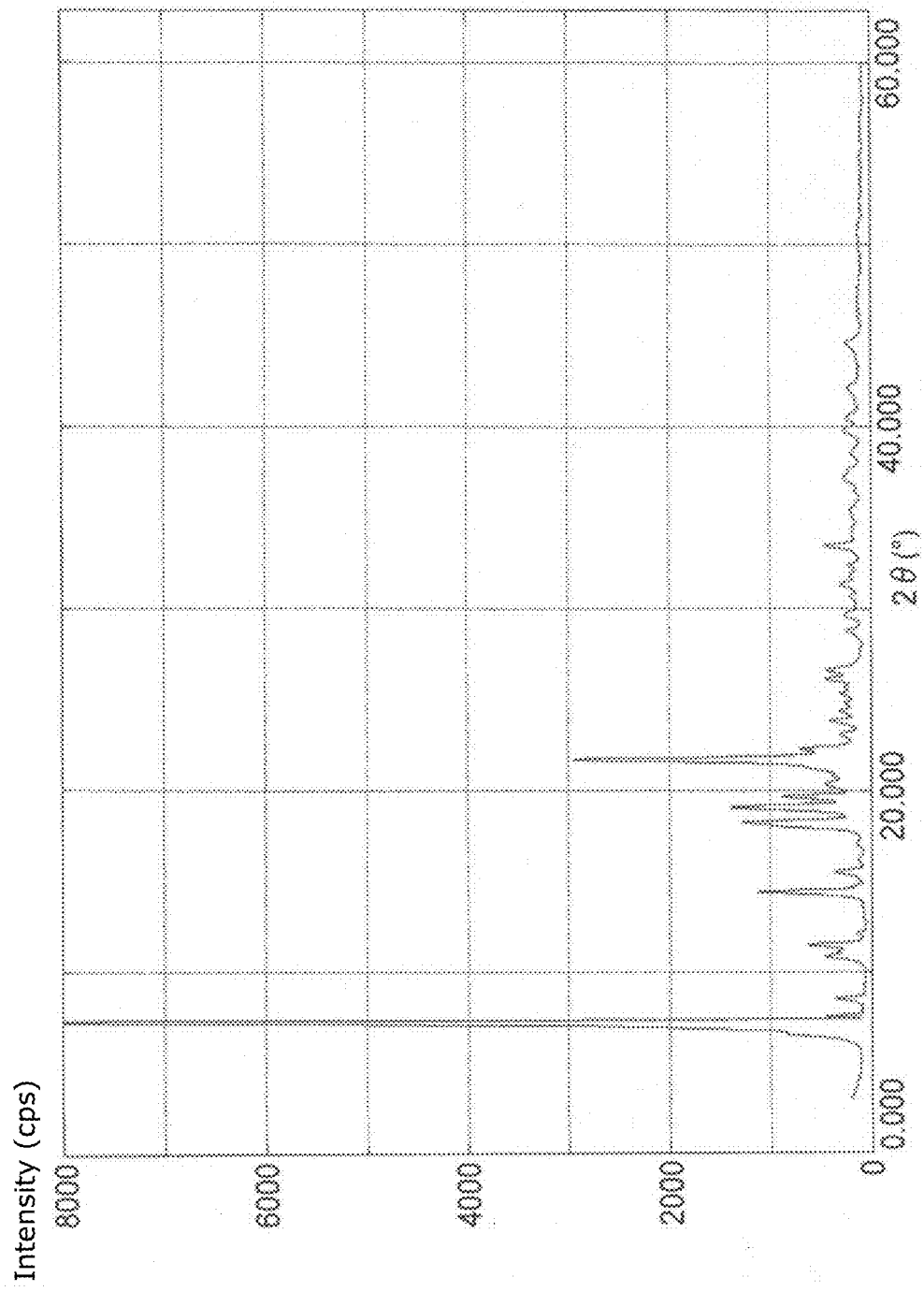

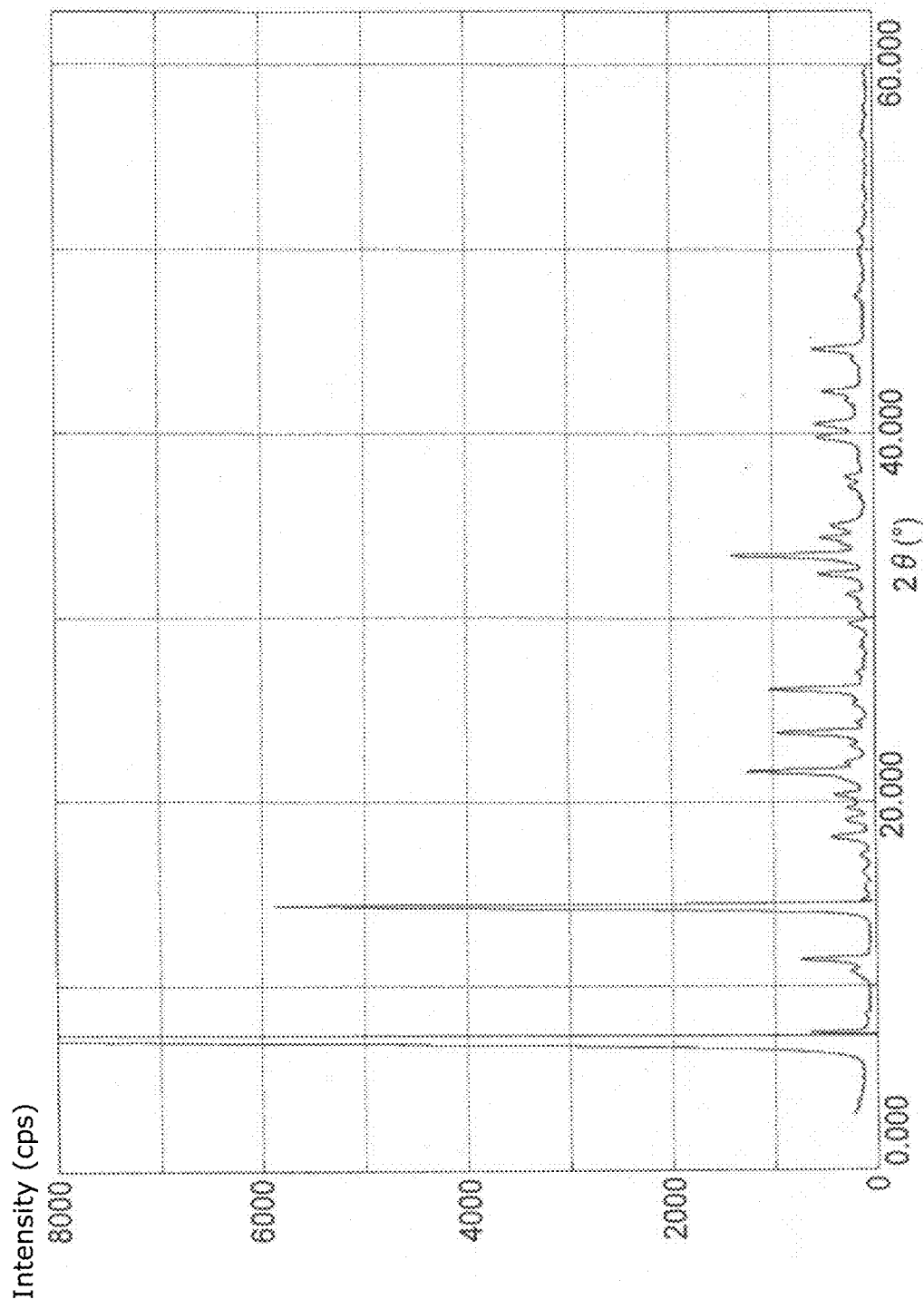
[FIG. 2]

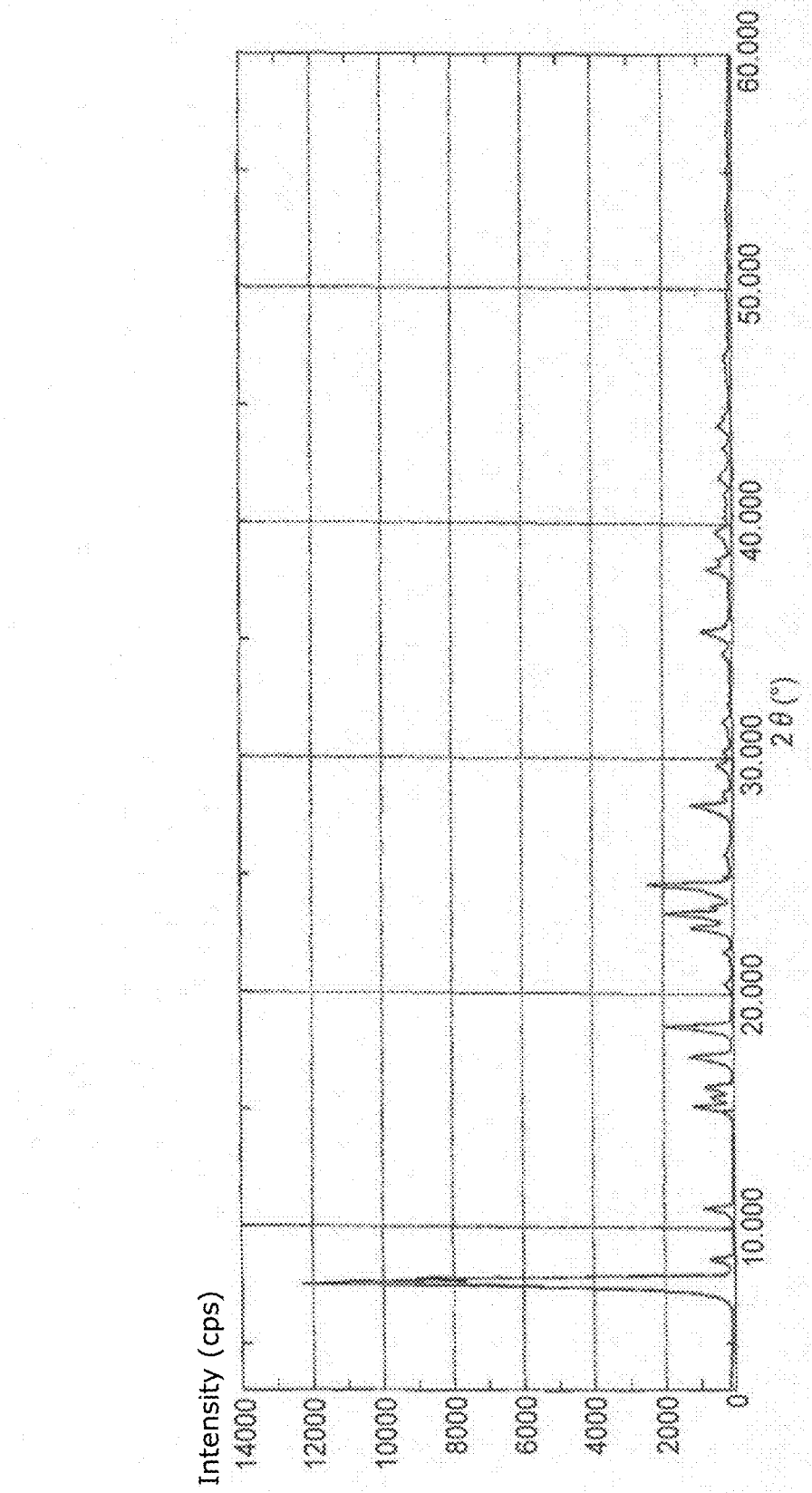
[FIG. 3]

[FIG. 4]

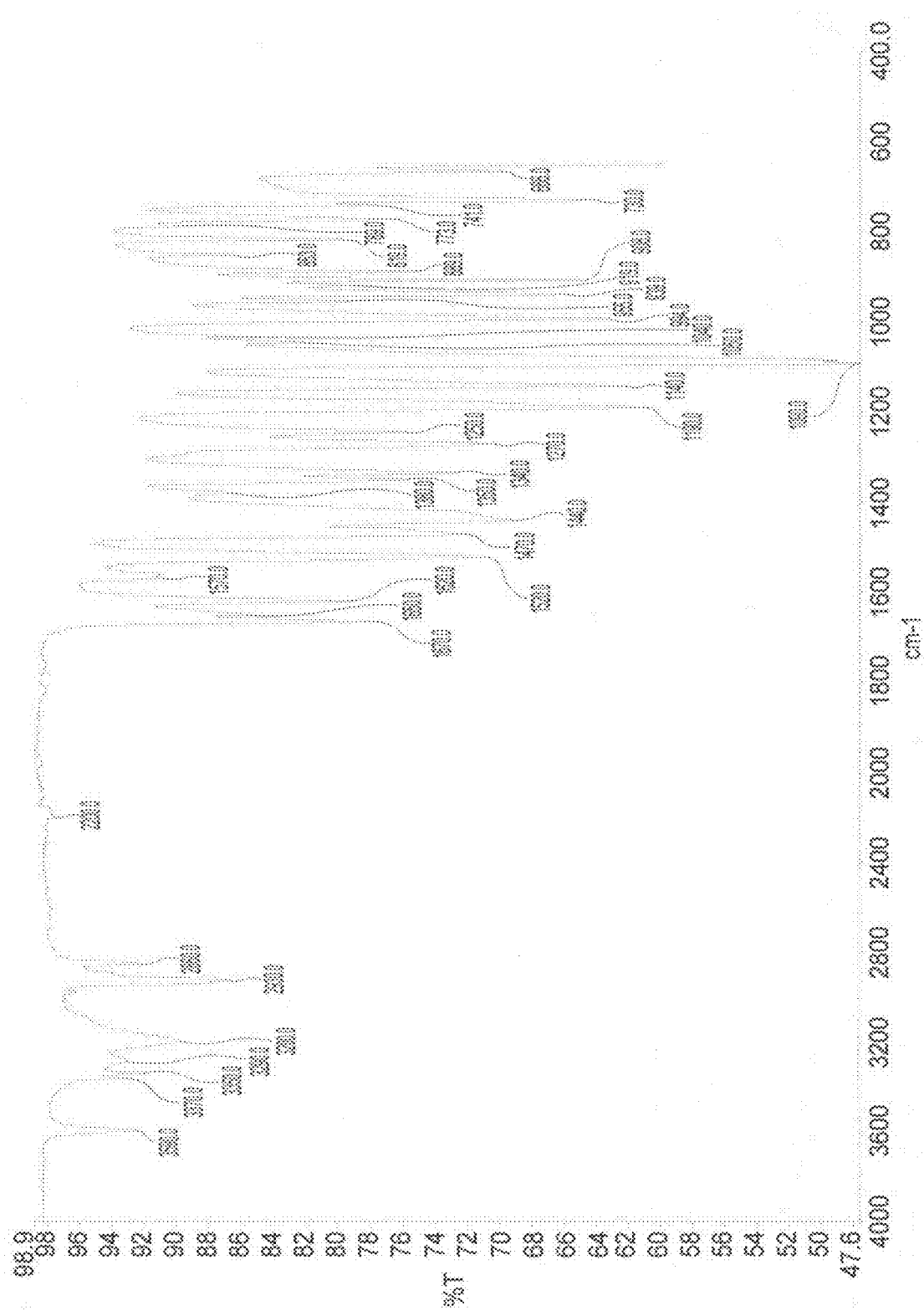
[FIG. 5]

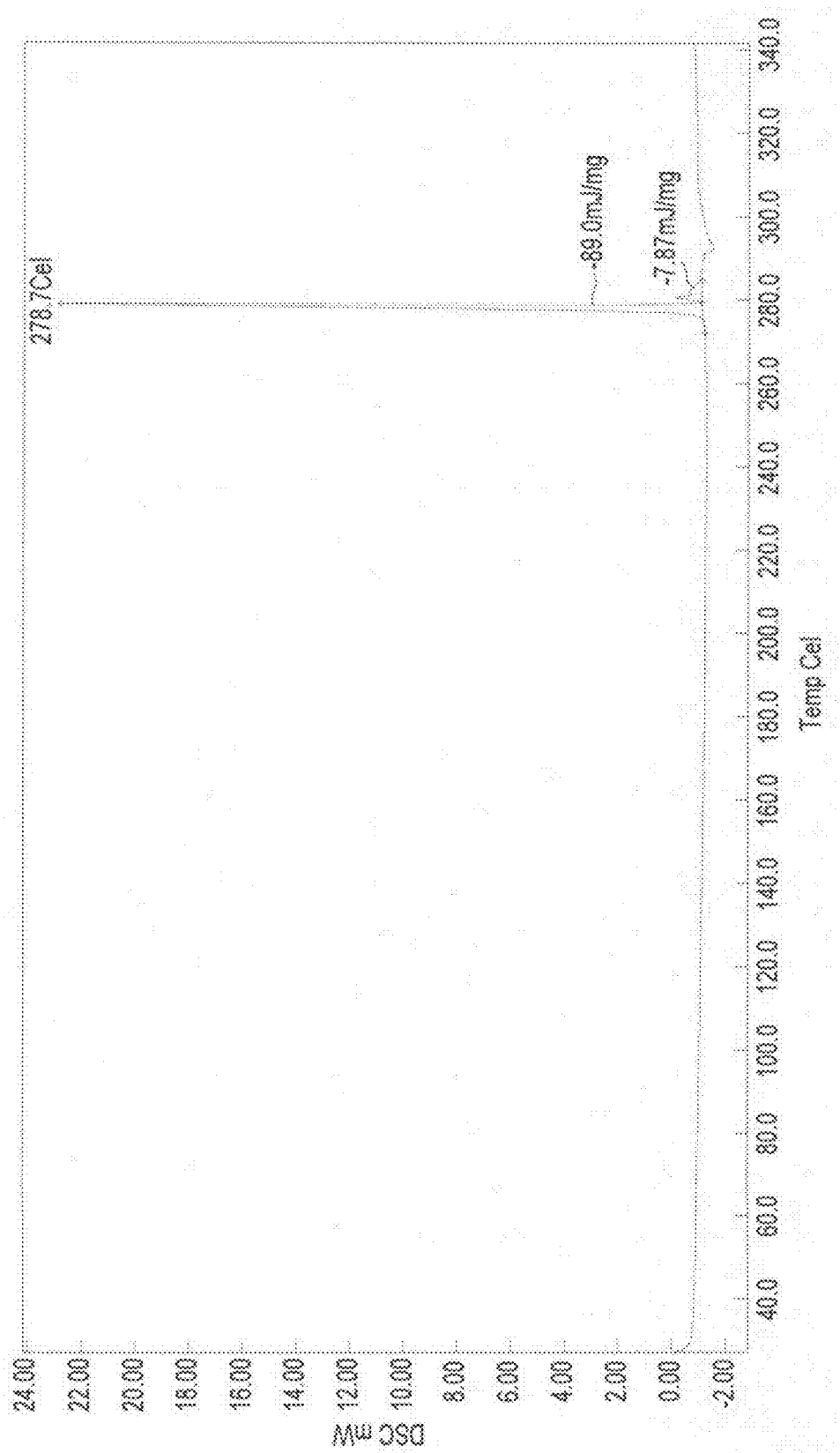
[FIG. 6]

[FIG. 7]
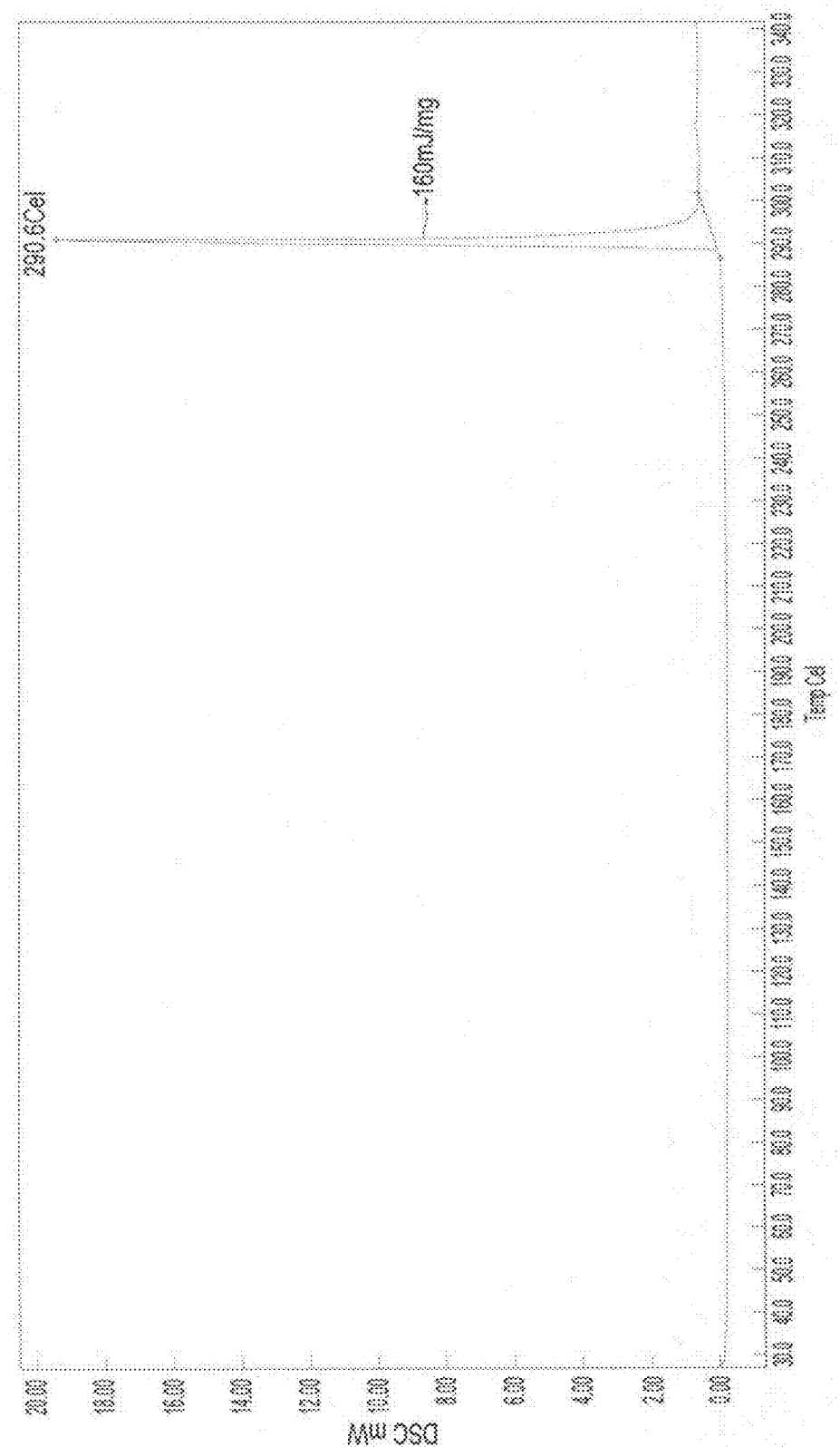

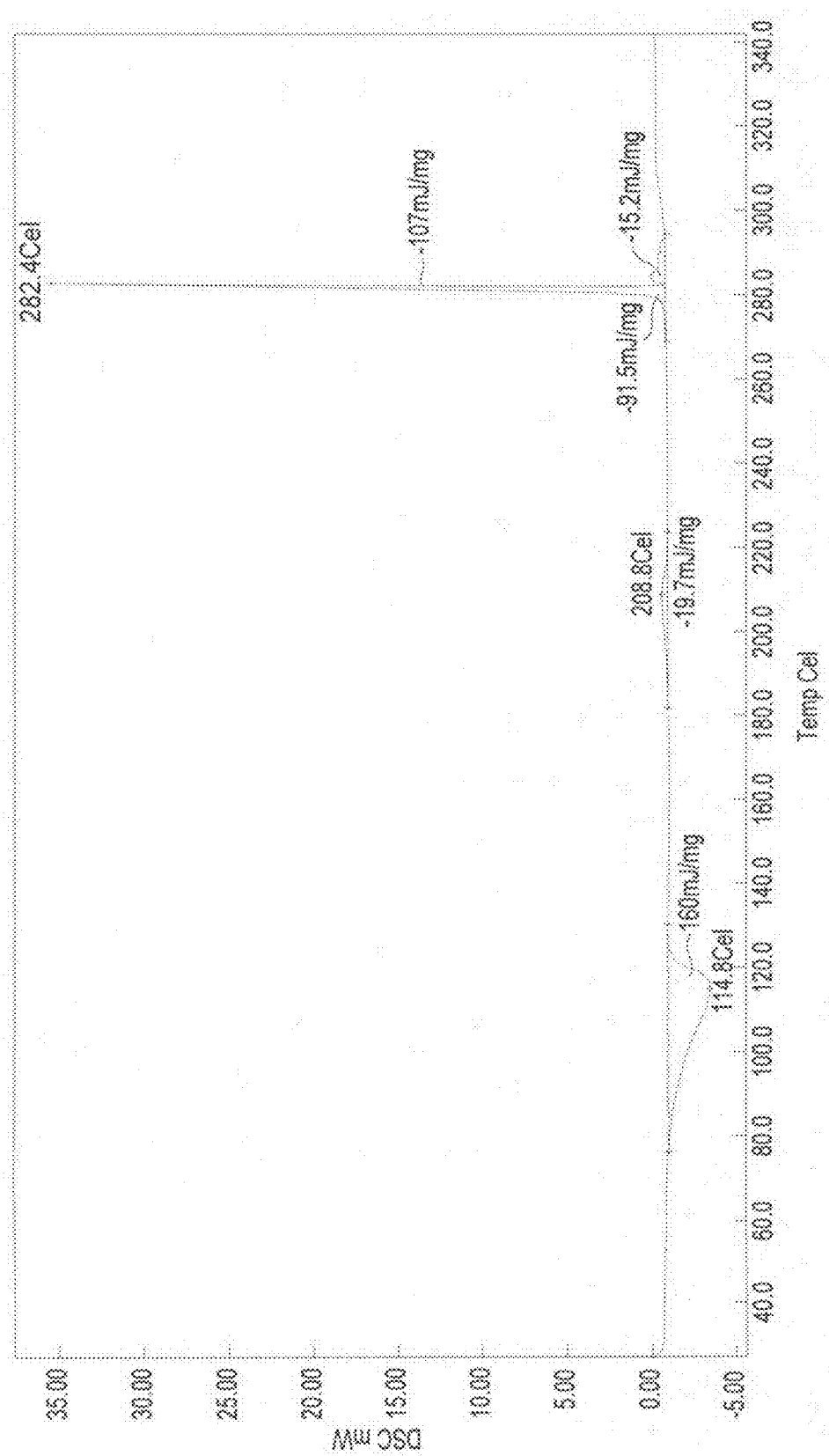
[FIG. 8]

[FIG. 9]
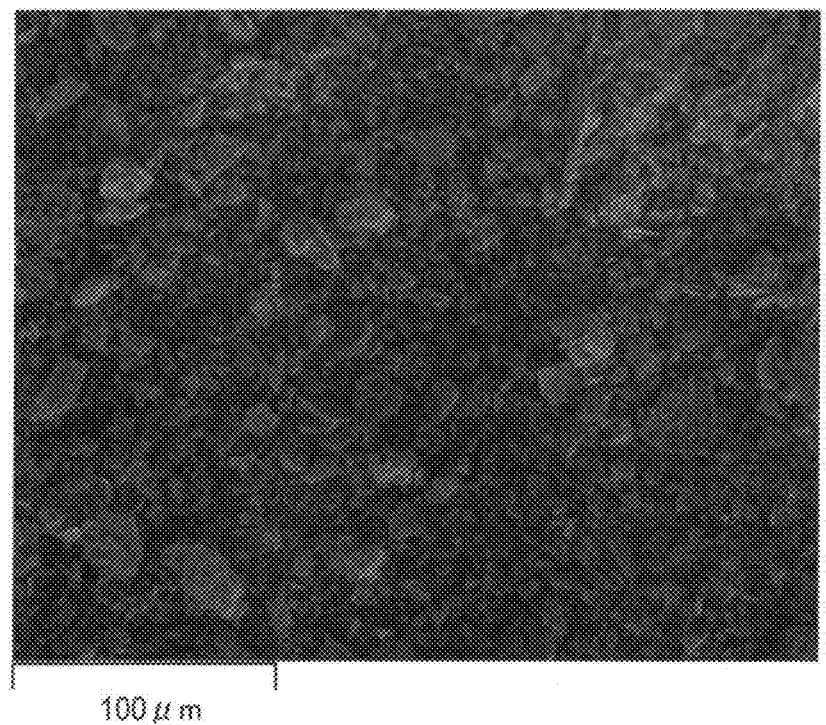
100 μm
[FIG. 10]
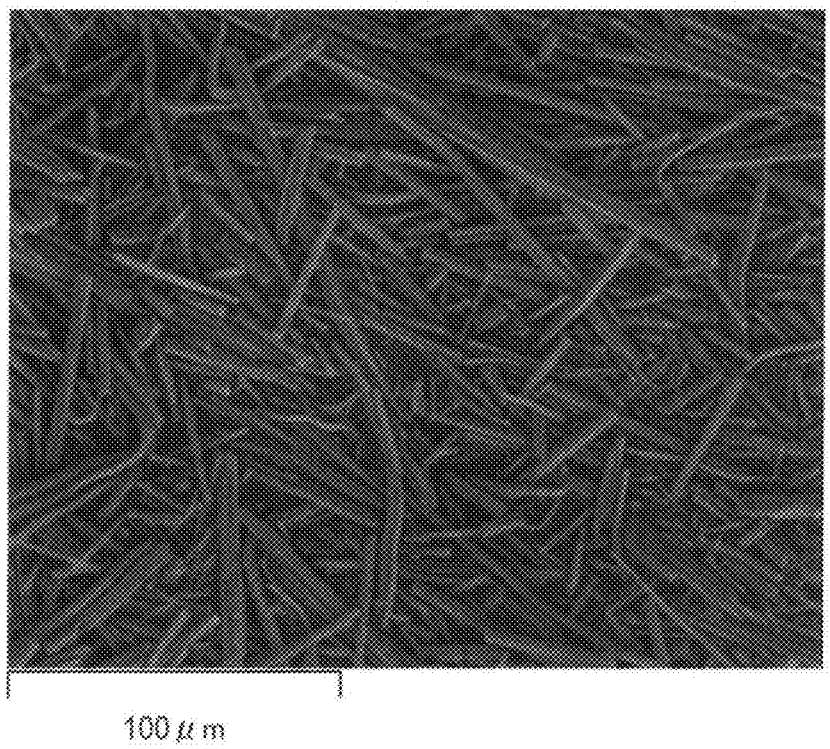
100 μm

ANHYDROUS CRYSTAL OF MONOSODIUM N-(2-ETHYLSULFONYLAMINO-5-TRIFLUOROMETHYL-3-PYRIDYL) CYCLOHEXANE CARBOXAMIDE

RELATED APPLICATION DATA

This application is a National Stage Application under 35 U.S.C. 371 of co-pending PCT application number PCT/JP2020/019382, designating the United States and filed May 15, 2020, which claims the benefit of JP application no. 2019-092309, filed May 15, 2019 each of which are hereby incorporated by reference in their entireties.

BACKGROUND OF THE INVENTION

Field of the Invention

The present invention relates to an anhydrous crystal of monosodium N-(2-ethylsulfonylamino-5-trifluoronnethyl-3-pyridyl)cyclohexane carboxamide.

Background Art

Monosodium N-(2-ethylsulfonylamino-5-trifluoromethyl-3-pyridyl)cyclohexane carboxamide is known as an effective compound as an anti-pancreatitis agent, an anti-lung failure therapeutic agent and an anti-shock agent in the treatment of pets or humans. For example, Patent Document 1 mentions that diaminotrifluoromethylpyridine derivatives including N-(2-ethylsulfonylamino-5-trifluoromethyl-3-pyridyl)cyclohexane carboxamide or salts thereof have phospholipase $A_2$ inhibitory effects and are useful as active ingredients for anti-inflammatory agents or anti-pancreatitis agents. Synthesis Example 5 of Patent Document 1 mentions that sodium N-(2-ethylsulfonylamino-5-trifluoromethyl-3-pyridyl)cyclohexane carboxamide was synthesized, and this is a monohydrous crystal containing 4.28% moisture.

Patent Document 2, Patent Document 3, Patent Document 4, Patent Document 5 and Patent Document 6 mention that salts of diaminotrifluoromethylpyridine derivatives including N-(2-ethylsulfonylamino-5-trifluoromethyl-3-pyridyl) cyclohexane carboxamide each are useful as anti-cancer agents, remedies or preventives for digestive diseases, remedies or preventives for liver diseases, remedies or preventives for pulmonary insufficiently and anti-shock agents. These documents mention that some salts of diaminotrifluoromethylpyridine derivatives including N-(2-ethylsulfonylamino-5-trifluoromethyl-3-pyridyl)cyclohexane carboxamide may have water of crystallization.

Meanwhile, there is no report on an anhydrous crystal of N-(2-ethylsulfonylamino-5-trifluoromethyl-3-pyridyl)cyclohexane carboxamide.

PRIOR ART DOCUMENTS

Patent Documents

Patent Document 1: JP 2762323 B2
Patent Document 2: WO 98/37887 A
Patent Document 3: WO 2001/56568 A
Patent Document 4: WO 2001/56569 A
Patent Document 5: WO 2001/56570 A
Patent Document 6: WO 2010/137484 A

SUMMARY OF THE INVENTION

As mentioned above, a monohydrous crystal has been reported as a crystal of sodium N-(2-ethylsulfonylamino-5-trifluoromethyl-3-pyridyl)cyclohexane carboxamide. However, investigations by the present inventors have revealed that, since the above-mentioned monohydrous crystal has a needle-like shape, in the formulation, it has a low density and becomes bulky, resulting in poor fluidity, and it is sometimes difficult to formulate.

This time, the present inventors have performed various investigations, and have found a novel anhydrous crystal of monosodium N-(2-ethylsulfonylamino-5-trifluoromethyl-3-pyridyl)cyclohexane carboxamide that has a high density, particularly a high bulk density and/or tapped density, and that is suitable for formulation. The present invention is based on such findings.

Therefore, the present invention provides a novel crystal of monosodium N-(2-ethylsulfonylamino-5-trifluoromethyl-3-pyridyl)cyclohexane carboxamide that has a high density, particularly a high bulk density and/or tapped density, and that is suitable for formulation.

Specifically, the present invention includes the following inventions.

(1) An anhydrous crystal of monosodium N-(2-ethylsulfonylamino-5-trifluoromethyl-3-pyridyl)cyclohexane carboxamide.

(2) The anhydrous crystal according to (1), wherein the powder X-ray diffraction pattern of the anhydrous crystal obtained by using Cu—Kα as a radiation source at a tube voltage of 30 kV and a tube current of 30 mA includes at least one peak at a diffraction angle of 2θ±0.2° selected from the group consisting of 7.3, 10.9, 11.5, 14.5, 15.6, 18.3, 19.0, 19.7, 21.7, 23.7, 26.0, 32.3, 33.5, 34.3, 40.6 and 44.6.

(3) The anhydrous crystal according to (1) or (2), wherein the powder X-ray diffraction pattern of the anhydrous crystal obtained by using Cu-Kα as a radiation source at a tube voltage of 30 kV and a tube current of 30 mA includes at least one peak at a diffraction angle of 2θ±0.2° selected from the group consisting of 7.3, 10.9, 11.5, 14.5, 15.6, 18.3, 19.0, 19.7, 21.7, 23.7 and 33.5.

(4) The anhydrous crystal according to any one of (1) to (3), wherein the powder X-ray diffraction pattern of the anhydrous crystal obtained by using Cu—Kα as a radiation source at a tube voltage of 30 kV and a tube current of 30 mA includes at least one peak at a diffraction angle of 2θ±0.2° selected from the group consisting of 7.3, 10.9, 11.5, 14.5, 15.6, 18.3, 19.0, 19.7, 21.7 and 33.5.

(5) The anhydrous crystal according to any one of (1) to (4), which has an absorption band at at least one wavelength of wavelengths 3,345±10, 2,930±10, 2,850±10, 1,660±10, 1,615±10, 1,560±10, 1,520±10, 1,460±10, 1,430±10, 1,350±10, 1,330±10, 1,280±10, 1,240±10, 1,200±10, 1,140±10, 1,115±10, 1,090±10, 1,000±10, 940±10, 910±10, 855±10, 820±10, 780±10, 770±10, 740±10 and 690±10 $cm^{-1}$ in an infrared absorption spectrum.

(6) A composition, including the anhydrous crystal according to any one of (1) to (5).

(7) The composition according to (6), which is liquid, semisolid or solid.

(8) The composition according to (6) or (7), which is in the form of a solid formulation selected from the group consisting of a tablet, a dust, a suppository, a capsule, a pill, a powder, a granule, a dry syrup, a powder inhalant, an orally disintegrating tablet, a sublingual tablet, a buccal tablet and a chewable agent.

(9) The composition according to any one of (6) to (8), which is for pharmaceutical or veterinary medicine.

(10) The composition according to any one of (6) to (9), which is for the treatment of diseases, pathological conditions or symptoms associated with inflammatory cells.

(11) A method for treating diseases, pathological conditions or symptoms associated with inflammatory cells in a subject, the method including administering an effective dose of the anhydrous crystal according to any one of (1) to (5) to the subject.

(12) The anhydrous crystal according to any one of (1) to (5), which is for the treatment of diseases, pathological conditions or symptoms associated with inflammatory cells.

(13) A method for producing the anhydrous crystal according to any one of (1) to (5), the method including:
  (a) a step of dissolving a monohydrate of monosodium N-(2-ethylsulfonylamino-5-trifluoromethyl-3-pyridyl)cyclohexane carboxamide in a solvent including one or a plurality selected from the group consisting of an alcohol, a sulfoxide, a nitrile and a ketone to obtain a solution,
  (b) a step of dehydrating the solution, and
  (c) a step of removing the solvent from the dehydrated solution to obtain the anhydrous crystal.

(14) The method according to (13), wherein the alcohol is a linear or branched alcohol having 1 to 4 carbon atoms.

(15) The method according to (13) or (14), wherein the alcohol is methanol or ethanol.

(16) The method according to any one of (13) to (15), wherein the alcohol is ethanol.

(17) The method according to any one of (13) to (16), wherein the dehydration in the step (b) is performed using a dehydrating agent.

(18) The method according to (17), wherein the dehydrating agent is at least one selected from the group consisting of magnesium sulfate, anhydrous sodium sulfate, calcium chloride, a molecular sieve, activated alumina, silica gel, metal hydride, metal oxide and phosphorus oxide.

(19) A method for producing the anhydrous crystal according to any one of (1) to (5), the method including:
  (a) a step of dissolving a monohydrate of monosodium N-(2-ethylsulfonylamino-5-trifluoromethyl-3-pyridyl)cyclohexane carboxamide in a 2-propanol-containing solvent to obtain a solution, and
  (b) a step of cooling the solution to form the anhydrous crystal.

(20) The method according to (19), wherein the content of 2-propanol in the 2-propanol-containing solvent is 50 to 100% by mass.

(21) The method according to (19) or (20), wherein the temperature of the 2-propanol-containing solvent is 70° C. or higher in the step (a).

(22) The method according to any one of (19) to (21), wherein the solution is cooled to 30° C. or lower in the step (b).

According to the present invention, it is possible to provide an anhydrous crystal of monosodium N-(2-ethylsulfonylamino-5-trifluoromethyl-3-pyridyl)cyclohexane carboxamide that has a high density, particularly a high bulk density and/or tapped density, and that is suitable for formulation. The anhydrous crystal of the present invention is advantageous in that it has excellent fluidity suitable for formulation. The anhydrous crystal of the present invention has good handleability and can be advantageously utilized in efficient production of a formulation. The anhydrous crystal of the present invention is advantageous in production of a formulation containing monosodium N-(2-ethylsulfonylamino-5-trifluoromethyl-3-pyridyl)cyclohexane carboxamide at a high density. The anhydrous crystal of the present invention has excellent solubility and can be advantageously utilized in production of a formulation having excellent absorbability. The anhydrous crystal of the present invention can avoid the release of water of crystallization due to heating, etc., and thus it is advantageous in stable production of a formulation.

BRIEF DESCRIPTION OF THE DRAWINGS

FIG. 1 shows a powder X-ray diffraction pattern of the anhydrous crystal of monosodium N-(2-ethylsulfonylamino-5-trifluoromethyl-3-pyridyl)cyclohexane carboxamide obtained in Production Example 1 (Production Method 1).

FIG. 2 shows a powder X-ray diffraction pattern of the anhydrous crystal of monosodium N-(2-ethylsulfonylamino-5-trifluoromethyl-3-pyridyl)cyclohexane carboxamide obtained in Production Example 2 (Production Method 2).

FIG. 3 shows a powder X-ray diffraction pattern of the monohydrous crystal powder of monosodium N-(2-ethylsulfonylamino-5-trifluoromethyl-3-pyridyl)cyclohexane carboxamide.

FIG. 4 shows an infrared absorption spectrum (IR) of the anhydrous crystal of monosodium N-(2-ethylsulfonylamino-5-trifluoromethyl-3-pyridyl)cyclohexane carboxamide obtained in Production Example 1.

FIG. 5 shows an infrared absorption spectrum (IR) of the monohydrous crystal of monosodium N-(2-ethylsulfonylamino-5-trifluoromethyl-3-pyridyl)cyclohexane carboxamide.

FIG. 6 shows a differential scanning calorimetry (DSC) curve of the anhydrous crystal of monosodium N-(2-ethylsulfonylamino-5-trifluoromethyl-3-pyridyl)cyclohexane carboxamide obtained in Production Example 1.

FIG. 7 shows a DSC curve of the anhydrous crystal of monosodium N-(2-ethylsulfonylamino-5-trifluoromethyl-3-pyridyl)cyclohexane carboxamide obtained in Production Example 2.

FIG. 8 shows a DSC curve of the monohydrous crystal powder of monosodium N-(2-ethylsulfonylamino-5-trifluoromethyl-3-pyridyl)cyclohexane carboxamide.

FIG. 9 shows a scanning electron microscopy (SEM) photograph of the anhydrous crystal of monosodium N-(2-ethylsulfonylamino-5-trifluoromethyl-3-pyridyl)cyclohexane carboxamide obtained in Production Example 1.

FIG. 10 shows a scanning electron microscopy (SEM) photograph of the monohydrous crystal particle of monosodium N-(2-ethylsulfonylamino-5-trifluoromethyl-3-pyridyl)cyclohexane carboxamide.

DETAILED DESCRIPTION OF THE INVENTION

An anhydrous crystal of the present invention substantially consists of anhydrous crystals of monosodium N-(2-ethylsulfonylamino-5-trifluoromethyl-3-pyridyl)cyclohexane carboxamide.

In the present invention, "anhydrous crystal" is intended to also include a crystal polymorph of anhydrous crystals. "Substantially consist of anhydrous crystals" means that the content of residues other than anhydrous crystals in the anhydrous crystal is less than 20% (by mass). The content of the above-mentioned residues in the anhydrous crystal is preferably 10% (by mass) or less, more preferably 5% (by mass) or less, still more preferably 1% (by mass) or less, and yet more preferably 0.5% (by mass) or less. Examples of the above-mentioned residues include production raw materials, crystal polymorphs other than anhydrous crystals, water of adhesion or mixtures thereof or the like, and a monohydrate of monosodium N-(2-ethylsulfonylamino-5-trifluoromethyl-3-pyridyl)cyclohexane carboxamide or a crystal thereof is preferred. Therefore, the content of anhydrous crystals in the anhydrous crystal is preferably more than 90% (by mass), more preferably more than 95% (by mass), still more preferably 99% (by mass) or more than 99% (by mass).

The anhydrous crystal of the present invention does not have water of crystallization, but may have water of adhesion. The amount of such water of adhesion is, for example, 3,000 ppm or less, and preferably 2,000 ppm or less. The amount of water of adhesion can be measured by a Karl Fischer method.

(Powder X-Ray Diffraction Pattern)

According to a preferred embodiment of the present invention, the anhydrous crystal can be characterized by a powder X-ray diffraction pattern. According to one embodiment, the powder X-ray diffraction pattern of the anhydrous crystal includes at least one peak at a diffraction angle of $2\theta \pm 0.2°$ selected from the group consisting of 7.3, 10.9, 11.5, 14.5, 15.6, 18.3, 19.0, 19.7, 21.7, 23.7, 26.0, 32.3, 33.5, 34.3, 40.6 and 44.6. The number of such peaks is preferably 2 or more, more preferably 5 to 16 or more, still more preferably 6 or more, yet more preferably 8 or more, further preferably 10 or more, still further preferably 12 or more, and yet further preferably 14 or more.

According to a preferred embodiment of the present invention, the powder X-ray diffraction pattern of the anhydrous crystal includes at least one peak at a diffraction angle of $2\theta \pm 0.2°$ selected from the group consisting of 7.3, 10.9, 11.5, 14.5, 15.6, 18.3, 19.0, 19.7, 21.7, 23.7 and 33.5. The number of such peaks is preferably 2 or more, more preferably 5 or more, still more preferably 6 or more, and yet more preferably 8 or more.

According to the other preferred embodiment of the present invention, the powder X-ray diffraction pattern of the anhydrous crystal includes at least one peak at a diffraction angle of $2\theta \pm 0.2°$ selected from the group consisting of 7.3, 10.9, 11.5, 14.5, 15.6, 18.3, 19.0, 19.7, 21.7 and 33.5. The number of such peaks is preferably 2 or more, more preferably 5, still more preferably 6 or more, and yet more preferably 8 or more.

According to the other preferred embodiment of the present invention, the anhydrous crystal is characterized by substantially the same powder X-ray diffraction pattern as in FIG. 1. Here, "substantially the same" means that the peak value is the same except for the range of measurement error. In the above-mentioned the other preferred embodiment, the measurement error of the peak in the powder X-ray diffraction pattern of the anhydrous crystal is not particularly limited, but it is preferably ±0.2 to ±0.4°, and more preferably ±0.2 to ±0.3°.

According to the other preferred embodiment of the present invention, the anhydrous crystal is characterized by substantially the same powder X-ray diffraction pattern as in FIG. 2. In the above-mentioned the other preferred embodiment, the measurement error of the peak in the powder X-ray diffraction pattern of the anhydrous crystal is not particularly limited, but it is preferably ±0.2 to ±0.4°, and more preferably ±0.2 to ±0.3°.

The above-mentioned powder X-ray diffraction pattern can be obtained by measurement using Cu-K$\alpha$ as a radiation source at a tube voltage of 30 kV and a tube current of 30 mA. Further details of such measurement can be performed in accordance with Test Example 1 mentioned later.

(Crystal Face Spacing)

According to a preferred embodiment of the present invention, the anhydrous crystal may be characterized by a crystal face spacing (also referred to as d value) of the anhydrous crystal. According to one embodiment, the d value of the anhydrous crystal includes at least one d value selected from the group consisting of 12.2, 8.1, 7.7, 6.1, 5.7, 4.8, 4.7, 4.5, 4.1, 3.8, 3.4, 2.8, 2.7, 2.6, 2.2 and 2.0. The number of such d values is preferably 2 or more, more preferably 5 or more, still more preferably 8 or more and 16 or less, yet more preferably 10 or more, further preferably 12 or more, and yet further preferably 14 or more.

According to the other embodiment of the present invention, the d value of the anhydrous crystal includes at least one d value selected from the group consisting of 12.2, 8.1, 7.7, 6.1, 5.7, 4.8, 4.7, 4.5, 4.1 and 2.7. The number of such d values is preferably 2 or more, more preferably 5 or more, and still more preferably 8 or more.

(Infrared Absorption Spectrum)

According to a preferred embodiment of the present invention, the anhydrous crystal can be characterized by an infrared absorption spectrum.

According to a preferred embodiment of the present invention, the infrared absorption spectrum of the anhydrous crystal has an absorption band(s) at at least one or a plurality of wavelength(s) of wavelengths 3,345±10, 2,930±10, 2,850±10, 1,660±10, 1,615±10, 1,560±10, 1,520±10, 1,460±10, 1,430±10, 1,350±10, 1,330±10, 1,280±10, 1,240±10, 1,200±10, 1,140±10, 1,115±10, 1,090±10, 1,000±10, 940±10, 910±10, 855±10, 820±10, 780±10, 770±10, 740±10 and 690±10 cm$^{-1}$. The number of absorption bands at such wavelength(s) is preferably 5 or more, preferably 8 or more, more preferably 9 or more, still more preferably 11 or more, yet more preferably 15 or more, further preferably 18 or more, still further preferably 22 or more, and yet further preferably 24 or more.

According to a preferred embodiment of the present invention, the infrared absorption spectrum of the anhydrous crystal has an absorption band(s) at at least one or a plurality of wavelength(s) of wavelengths 3,345±5, 2,930±5, 2,850±5, 1,660±5, 1,615±5, 1,560±5, 1,520±5, 1,460±5, 1,430±5, 1,350±5, 1,330±5, 1,280±5, 1,240±5, 1,200±5, 1,140±5, 1,115±5, 1,090±5, 1,000±5, 940±5, 910±5, 855±5, 820±5, 780±5, 770±5, 740±5 and 690±5 cm$^{-1}$. The number of absorption bands at such wavelength(s) is preferably 5 or more, preferably 8 or more, more preferably 9 or more, still more preferably 11 or more, yet more preferably 15 or more, further preferably 18 or more, still further preferably 22 or more, and yet further preferably 24 or more.

According to the other preferred embodiment of the present invention, the anhydrous crystal is characterized by substantially the same infrared absorption spectrum as in FIG. 4. In such embodiment, the measurement error of the wavelength of the absorption band in the infrared absorption spectrum of the anhydrous crystal is not particularly limited, but it is preferably ±5 to ±15, more preferably ±5 to ±12, and still more preferably ±5 to ±10.

The infrared absorption spectrum in the present invention can be measured by the attenuated total reflection method (ATR method) of Infrared Spectrophotometry mentioned in General Tests, Processes and Apparatus mentioned in the Japanese Pharmacopoeia, Seventeenth Edition.

(Differential scanning calorimetry: DSC)

According to a preferred embodiment of the present invention, the anhydrous crystal can be characterized by an exothermic peak in DSC.

As shown in FIG. 8, the monohydrous crystal of monosodium N-(2-ethylsulfonylamino-5-trifluoromethyl-3- pyridyl)cyclohexane carboxamide exhibits an endothermic peak due to release of water of crystallization, an exothermic peak due to phase transition and an exothermic peak due to decomposition. Meanwhile, as shown in FIG. 6 and FIG. 7, the anhydrous crystal does not exhibit peaks other than an exothermic peak due to decomposition, and thus it is advantageous in production of a stable formulation.

According to one embodiment of the present invention, the anhydrous crystal exhibits an exothermic peak at preferably 265 to 300° C., more preferably 265 to 295° C., and still more preferably 268 to 293° C. in DSC.

According to the other embodiment of the present invention, the anhydrous crystal exhibits an exothermic peak at preferably 265 to 285° C., more preferably 270 to 280° C., and still more preferably 275 to 280° C. in DSC.

According to further the other embodiment of the present invention, the anhydrous crystal exhibits an exothermic peak at preferably 270 to 300° C., more preferably 275 to 300° C., and still more preferably 280 to 295° C. in DSC.

According to further the other embodiment of the present invention, the anhydrous crystal exhibits substantially the same exothermic peak as in FIG. 6 in DSC. The measurement error of the exothermic peak of the anhydrous crystal in such embodiment is not particularly limited, but it is preferably 0.1 to 10° C., more preferably 0.1 to 5° C., and still more preferably 0.1 to 3° C.

According to further the other embodiment of the present invention, the anhydrous crystal exhibits substantially the same exothermic peak as in FIG. 7 in DSC. The measurement error of the exothermic peak of the anhydrous crystal in such embodiment is not particularly limited, but it is preferably 0.1 to 10° C., more preferably 0.1 to 5° C., and still more preferably 0.1 to 3° C.

DSC in the present invention can be simply performed by using a commercially available differential scanning calorimeter (e.g., manufactured by Seiko Instruments Inc.). Further details of such measurement can be performed in accordance with Test Example 4 mentioned later.

(Shape, Particle Size Distribution)

According to a preferred embodiment of the present invention, the particle shape of the anhydrous crystal is massive. The particle shape of the anhydrous crystal can be confirmed by scanning electron microscopy. As shown in FIG. 9, the particle shape of the anhydrous crystal is massive, and thus it is advantageous in ensuring the fluidity and making handling in formulation easy.

According to a preferred embodiment of the present invention, the long diameter of the particle of the anhydrous crystal is not particularly limited, but the lower limit is, for example, 0.1 μm or more, and preferably 1 μm or more, and the upper limit is, for example, 300 μm or less, preferably 200 μm or less, and more preferably 150 μm or less.

According to a preferred embodiment of the present invention, the long diameter ($d_{50}$) of the particle of the anhydrous crystal is not particularly limited, but it is, for example, 0.1 to 100 μm, preferably 1 to 50 μm, and more preferably 1 to 10 μm. Here, $d_{50}$ represents a volume average particle diameter, namely, a median diameter.

According to a preferred embodiment of the present invention, the short diameter of the particle of the anhydrous crystal is not particularly limited, but the lower limit is, for example, 0.1 μm or more, and preferably 0.5 μm or more, and the upper limit is, for example, 200 μm or less, preferably 150 μm or less, and more preferably 140 μm or less.

According to a preferred embodiment of the present invention, the short diameter ($d_{50}$) of the particle of the anhydrous crystal is not particularly limited, but it is, for example, 0.1 to 50 μm, preferably 1 to 30 μm, and more preferably 1 to 5 μm.

According to a preferred embodiment of the present invention, the aspect ratio (long diameter/short diameter) of the particle of the anhydrous crystal is not particularly limited, but it is, for example, 0.1 to 10, preferably 0.5 to 8, and more preferably 1 to 6.

According to a preferred embodiment of the present invention, the aspect ratio (long diameter ($d_{50}$)/short diameter ($d_{50}$)) of the particle of the anhydrous crystal is not particularly limited, but it is, for example, 0.1 to 10, preferably 1 to 5, and more preferably 1 to 2.5.

The long diameter, the short diameter and the aspect ratio of the particle are measured with a particle shape image analyzer by a dynamic image analysis method. Such measurement can be simply performed by using a commercially available apparatus (e.g., PITA-3 (SEISHIN ENTERPRISE Co., Ltd.)). Further details of measurement of the long diameter, the short diameter and the aspect ratio of the particle can be performed in accordance with the description of Test Example 5 mentioned later.

The particle of the anhydrous crystal mentioned above is not particularly limited, but, for example, it can be prepared by Production Method 1 or Production Method 2 mentioned as the method for producing an anhydrous crystal mentioned later.

(Bulk Density, Tapped Density, Specific Surface Area and Angle of Repose)

The anhydrous crystal of the present invention has a high density compared with the monohydrous crystal, and thus it may have excellent fluidity. Therefore, the anhydrous crystal of the present invention is particularly advantageous in formulation.

According to a preferred embodiment of the present invention, the bulk density of the particle of the anhydrous crystal is not particularly limited, but it is, for example, 0.2 to 0.5 g/mL, preferably 0.25 to 0.4 g/mL.

The above-mentioned bulk density can be measured in accordance with Method 3 (measuring vessel) of Determination of Bulk Density mentioned in the Japanese Pharmacopoeia, Seventeenth Edition.

According to the other preferred embodiment of the present invention, the tapped density of the particle of the anhydrous crystal is not particularly limited, but it is, for example, 0.25 to 0.5 g/mL, preferably 0.3 to 0.4 g/mL. The above-mentioned tapped density can be measured in accordance with Method 3 of Determination of Tapped Density mentioned in the Japanese Pharmacopoeia, Seventeenth Edition.

According to the other preferred embodiment of the present invention, the specific surface area of the particle of the anhydrous crystal is not particularly limited, but it is, for example, 2.8 to 4.2 $m^2/g$, and preferably 3 to 4 $m^2/g$. The above-mentioned specific surface area can be measured by a nitrogen adsorption method.

According to the other preferred embodiment of the present invention, the angle of repose of the particle of the anhydrous crystal is preferably smaller than the angle of repose of the particle of the monohydrous crystal.

The above-mentioned angle of repose can be measured in accordance with Angle of repose mentioned in the Japanese Pharmacopoeia, Seventeenth Edition.

(Combination)

According to a preferred embodiment of the present invention, the powder X-ray diffraction pattern of the anhydrous crystal includes at least 8 or more peaks at a diffraction angle of 2θ±0.2° selected from the group consisting of 7.3, 10.9, 11.5, 14.5, 15.6, 18.3, 19.0, 19.7, 21.7, 23.7 and 33.5, and the infrared absorption spectrum of the anhydrous crystal has absorption bands at at least 11 or more wavelengths of wavelengths 3,345±10, 2,930±10, 2,850±10, 1,660±10, 1,615±10, 1,560±10, 1,520±10, 1,460±10, 1,430±10, 1,350±10, 1,330±10, 1,280±10, 1,240±10, 1,200±10, 1,140±10, 1,115±10, 1,090±10, 1,000±10, 940±10, 910±10, 855±10, 820±10, 780±10, 770±10, 740±10 and 690±10 cm$^{-1}$.

In the above-mentioned preferred embodiments, the anhydrous crystal exhibits an exothermic peak at preferably 265 to 300° C., more preferably 270 to 300° C., and still more preferably 275 to 295° C. in DSC.

In any of the above-mentioned preferred embodiments, the long diameter of the particle of the anhydrous crystal is preferably 1 to 150 μm.

In any of the above-mentioned preferred embodiments, the long diameter ($d_{50}$) of the particle of the anhydrous crystal is preferably 1 to 50 μm.

In any of the above-mentioned preferred embodiments, the short diameter of the particle of the anhydrous crystal is preferably 0.5 to 140 μm.

In any of the above-mentioned preferred embodiments, the short diameter ($d_{50}$) of the particle of the anhydrous crystal is preferably 1 to 30 μm.

In any of the above-mentioned preferred embodiments, the aspect ratio (long diameter/short diameter) of the particle of the anhydrous crystal is preferably 1 to 10.

In any of the above-mentioned preferred embodiments, the aspect ratio (long diameter ($d_{50}$)/short diameter ($d_{50}$)) of the particle of the anhydrous crystal is preferably 1 to 5.

In any of the above-mentioned preferred embodiments, the bulk density of the particle of the anhydrous crystal is not particularly limited, but it is preferably 0.2 to 0.5 g/mL.

In any of the above-mentioned preferred embodiments, the tapped density of the particle of the anhydrous crystal is not particularly limited, but it is preferably 0.25 to 0.5 g/mL.

According to a preferred embodiment of the present invention, the powder X-ray diffraction pattern of the anhydrous crystal includes at least 8 or more peaks at a diffraction angle of 2θ±0.2° selected from the group consisting of 7.3, 10.9, 11.5, 14.5, 15.6, 18.3, 19.0, 19.7, 21.7, 23.7, 26.0, 32.3, 33.5, 34.3, 40.6 and 44.6, and the infrared absorption spectrum of the anhydrous crystal has absorption bands at at least 11 or more wavelengths of wavelengths 3,345±10, 2,930±10, 2,850±10, 1,660±10, 1,615±10, 1,560±10, 1,520±10, 1,460±10, 1,430±10, 1,350±10, 1,330±10, 1,280±10, 1,240±10, 1,200±10, 1,140±10, 1,115±10, 1,090±10, 1,000±10, 940±10, 910±10, 855±10, 820±10, 780±10, 770±10, 740±10 and 690±10 cm$^{-1}$.

In the above-mentioned other preferred embodiments, the anhydrous crystal exhibits an exothermic peak at preferably 265 to 300° C., more preferably 270 to 300° C., and still more preferably 275 to 295° C. in DSC.

In any of the above-mentioned other preferred embodiments, the long diameter of the particle of the anhydrous crystal is preferably 1 to 150 μm.

In any of the above-mentioned other preferred embodiments, the long diameter ($d_{50}$) of the particle of the anhydrous crystal is preferably 1 to 50 μm.

In any of the above-mentioned other preferred embodiments, the short diameter of the particle of the anhydrous crystal is preferably 0.5 to 140 μm.

In any of the above-mentioned other preferred embodiments, the short diameter ($d_{50}$) of the particle of the anhydrous crystal is preferably 1 to 30 μm.

In any of the above-mentioned other preferred embodiments, the aspect ratio (long diameter/short diameter) of the particle of the anhydrous crystal is preferably 1 to 10.

In any of the above-mentioned other preferred embodiments, the aspect ratio (long diameter ($d_{50}$)/short diameter ($d_{50}$)) of the particle of the anhydrous crystal is preferably 1 to 5.

In any of the above-mentioned other preferred embodiments, the bulk density of the particle of the anhydrous crystal is not particularly limited, but it is preferably 0.2 to 0.5 g/mL.

In any of the above-mentioned other preferred embodiments, the tapped density of the particle of the anhydrous crystal is not particularly limited, but it is preferably 0.25 to 0.5 g/mL.

(Method for Producing Anhydrous Crystal)

The method for producing the anhydrous crystal of the present invention is not particularly limited, but, for example, the anhydrous crystal can be suitably produced by the following Production Method 1 or Production Method 2.

(Production Method 1)

According to one embodiment of the present invention, the method for producing the anhydrous crystal (Production Method 1) is a method including:

(a) a step of dissolving a monohydrate of monosodium N-(2-ethylsulfonylamino-5-trifluoromethyl-3-pyridyl)cyclohexane carboxamide in a solvent including one or a plurality selected from the group consisting of an alcohol, a sulfoxide, a nitrile and a ketone to obtain a solution, (b) a step of dehydrating the solution, and (c) a step of removing the solvent in the dehydrated solution to obtain the anhydrous crystal.

In the step (a) of Production Method 1, as mentioned above, a monohydrate of monosodium N-(2-ethylsulfonylamino-5-trifluoromethyl-3-pyridyl)cyclohexane carboxamide is dissolved in the above-mentioned solvent to obtain a solution. Such solution may be produced by appropriately mixing the above-mentioned solvent with the monohydrate.

Of the solvents used in the step (a) of Production Method 1, the alcohol may be a primary, secondary or tertiary alcohol, and it is preferably a primary alcohol. More specifically, examples of the above-mentioned alcohol include a linear or branched alcohol having 1 to 4 carbon atoms, and it is preferably methanol or ethanol, and more preferably ethanol.

Examples of the sulfoxide used in the step (a) of Production Method 1 include dimethyl sulfoxide, diethyl sulfoxide and mixtures thereof, and it is preferably dimethyl sulfoxide.

Examples of the nitrile used in the step (a) of Production Method 1 include acetonitrile, propionitrile, butyronitrile and mixtures thereof, and it is preferably acetonitrile.

Examples of the ketone used in the step (a) of Production Method 1 include acetone, methyl ethyl ketone, diethyl ketone, methyl propyl ketone, methyl amyl ketone, cyclohexanone, methyl isobutyl ketone and mixtures thereof, and it is preferably acetone.

The constitution proportion of the solvent used in the step (a) of Production Method 1 is not particularly limited and may be appropriately adjusted by a person skilled in the art, but the above-mentioned solvent preferably contains at least an alcohol. The alcohol content (by mass) in the above-mentioned solvent is preferably 10 to 100%, more preferably 30 to 100%, still more preferably 50 to 100%, and yet more preferably 70 to 100%.

The solvent used in the step (a) of Production Method 1 may be dehydrated in advance in terms of efficiently performing water removal in the step (b). Such dehydration method is not particularly limited, but it is preferable that the dehydration is performed by adding a dehydrating agent to the solvent and mixing them. As the above-mentioned dehydrating agent, the same dehydrating agent as the dehydrating agent used in the step (b) of Production Method 1 mentioned later can be used. The water content of the solvent used in the step (a) is not particularly limited, but it is, for example, 0 to 5,000 ppm, preferably 0 to 1,000 ppm, and more preferably 0 to 500 ppm.

The temperature and the amount of the solvent used in the step (a) of Production Method 1 are not particularly limited and can be appropriately set by a person skilled in the art depending on the amount of a monohydrate to be dissolved, etc. The temperature of the above-mentioned solvent is, for example, 0 to 120° C. The mass ratio of the amount of the monohydrate to the amount of the solvent mentioned above (monohydrate:solvent) is, for example, 1:1 to 1:200.

In the step (b) of Production Method 1, the solution obtained in the step (a) is dehydrated as mentioned above.

The dehydration method in the step (b) of Production Method 1 is not particularly limited, but it is preferable that the dehydration is performed by adding a dehydrating agent to the solution obtained in the step (a) and mixing them. Examples of the above-mentioned dehydrating agent include at least one selected from the group consisting of magnesium sulfate, anhydrous sodium sulfate, calcium chloride, a molecular sieve, activated alumina, silica gel, metal hydride, metal oxide and phosphorus oxide, and it is preferably a molecular sieve.

The amount of the dehydrating agent used in the step (b) of Production Method 1 may be appropriately determined by a person skilled in the art in consideration of the water content in the solution, and, for example, when a non-dehydrated solvent is used in the step (a) of Production Method 1, the amount of the dehydrating agent used in the step (b) may be increased compared with using a dehydrated solvent. The amount of the dehydrating agent used in the step (b) is not particularly limited, but, for example, it can be 1 to 100 parts by mass based on 100 parts by mass of the solvent.

The time applied to the dehydration in the step (b) is not particularly limited, but it is, for example, about 10 to 24 hours. The water content (by mass) of the dehydrated solution obtained in the step (b) of Production Method 1 is obvious from the above-mentioned dehydration conditions and is not particularly limited, but it is, for example, 0 to 1,000 ppm, preferably 0 to 500 ppm, and more preferably 0 to 200 ppm.

In the step (c) of Production Method 1, the solvent in the dehydrated solution obtained in the step (b) is removed to obtain the anhydrous crystal.

When a dehydrating agent is used in the step (b), it is preferable that the dehydrating agent is removed by, for example, a method such as filtration from the dehydrated solution in the step (c). Such removal of the dehydrating agent is preferably performed before removal of the solvent.

The method for removing the solvent in the step (c) of Production Method 1 is not particularly limited as long as the effects of the present invention are not impaired, but examples thereof include evaporation under reduced pressure and evaporation under normal pressure at an ambient temperature to 150° C., and it is preferably evaporation under reduced pressure.

(Production Method 2)

According to the other embodiment of the present invention, the method for producing the anhydrous crystal (Production Method 2) is a method including:
(a) a step of dissolving a monohydrate of monosodium N-(2-ethylsulfonylamino-5-trifluoromethyl-3-pyridyl)cyclohexane carboxamide in a 2-propanol-containing solvent to obtain a solution, and
(b) a step of cooling the solution to form the anhydrous crystal.

In the step (a) of Production Method 2, as mentioned above, it is possible to obtain a solution by appropriately mixing a monohydrate of monosodium N-(2-ethylsulfonylamino-5-trifluoromethyl-3-pyridyl)cyclohexane carboxamide with a 2-propanol-containing solvent. Such solution may be produced by appropriately mixing the 2-propanol-containing solvent with the monohydrate.

As the solvent used in the step (a) of Production Method 2, as mentioned above, a 2-propanol-containing solvent is used. In the 2-propanol-containing solvent, examples of the solvents used other than 2-propanol include water, methanol, ethanol and the like.

The 2-propanol-containing solvent is preferably a solvent in which 2-propanol is a main component, and more preferably a solvent consisting of 2-propanol. The specific content (by mass) of 2-propanol in the 2-propanol-containing solvent is not particularly limited, but it is preferably 50 to 100%, more preferably 80 to 100%, and still more preferably 90 to 100%. When the 2-propanol-containing solvent contains water, the specific content (by mass) of water in the 2-propanol-containing solvent is not particularly limited, but it is, for example, 2% or less, preferably less than 2%, more preferably 1.5% or less, and still more preferably 1% or less. When the 2-propanol-containing solvent contains water, the lower limit of the content (by mass) of water in the 2-propanol-containing solvent is not particularly limited, but it is preferably 0%.

The heating temperature of the 2-propanol-containing solvent in the step (a) of Production Method 2 is not particularly limited, but it is preferably 70° C. or higher, and more preferably 70 to 80° C.

In the step (b) of Production Method 2, the solution obtained in the step (a) mentioned above is cooled to form the anhydrous crystal. In such step (b), a seed crystal may be used, or a seed crystal may not be used.

The cooling temperature of the solution in the step (b) of Production Method 2 is not particularly limited, but it is preferably 30° C. or lower, more preferably 5 to 30° C., and still more preferably room temperature (15 to 25° C.).

(Composition)

The anhydrous crystal of the present invention may be used as it is, and, if desired, it may be used together with other components other than the anhydrous crystal. Therefore, according to one embodiment of the present invention, a composition including the anhydrous crystal of the present invention is provided. In the composition of the present invention, the other components other than the anhydrous crystal are not particularly limited, but examples thereof include pharmaceutically or orally acceptable additives. The pharmaceutically or orally acceptable additives are not particularly limited, but examples thereof include aqueous vehicles such as purified water, solvents, substrates, solubilizing agents, isotonizing agents, stabilizers, preservatives, antiseptics, surfactants, adjusters, chelating agents, pH adjusters, buffers, excipients, thickeners, coloring agents, aromatics, flavors, antioxidants, dispersants, disintegrators, plasticizers, emulsifiers, solubilizers, reducing agents, sweetening agents, corrigents, binders and the like. The composition of the present invention can be produced by mixing the anhydrous crystal with the above-mentioned other components if desired.

The content of the anhydrous crystal in the composition of the present invention is not particularly limited, but it is, for example, 0.01 to 50% by mass, preferably 0.05 to 30% by mass, and more preferably 0.1 to 15% by mass, based on the total mass of the composition.

According to one embodiment of the present invention, the shape of the above-mentioned composition is not particularly limited, and it may be any shape. The above-mentioned composition is, for example, liquid (including oily, slurry), semisolid (including paste, gel) or solid, and it is preferably solid or semisolid.

The composition of the present invention can be used as a formulation. The dosage form of the above-mentioned composition is not particularly limited, and examples thereof include injections, tablets, capsules, pills, dusts, powders, granules, syrups, dry syrups, emulsions, solutions, inhalants, aerosol agents, powder inhalants, suppositories, ointments, creams, gels, patches, drops, eye drops, nasal drops, orally disintegrating tablets, sublingual tablets, buccal tablets, chewable agents and the like.

According to a preferred embodiment of the present invention, the dosage form of the above-mentioned composition is preferably a solid formulation. Regarding the anhydrous crystal, release of water of crystallization due to heat does not occur even during the compression for making a solid formulation, and thus the anhydrous crystal is advantageous in terms of stable preparation of a formulation. Examples of the solid formulation include a tablet, a dust, a suppository, a capsule, a pill, a powder, a granule, a dry syrup, a powder inhalant, an orally disintegrating tablet, a sublingual tablet, a buccal tablet, a chewable agent and the like, but it is preferably a tablet or a chewable agent, and more preferably a tablet.

(Application)

According to one embodiment of the present invention, the composition of the present invention is provided as a composition for pharmaceutical or veterinary medicine. The composition of the present invention can also be used as a pharmaceutical or a quasi-drug for humans or animals.

The composition of the present invention can be used for the treatment of diseases, pathological conditions or symptoms for which administration of monosodium N-(2-ethylsulfonylamino-5-trifluoromethyl-3-pyridyl)cyclohexane carboxamide constituting the anhydrous crystal is effective. Here, "treatment" includes not only treatment of established diseases, pathological conditions or symptoms but also prevention of diseases, pathological conditions or symptoms that may be established in the future. Examples of such diseases, pathological conditions or symptoms include diseases, pathological conditions or symptoms associated with inflammatory cells (e.g., granulocytes (neutrophils, eosinophils, basophils), lymphocytes (e.g., T-lymphocyte, NK cells), monocytes, macrophages, plasma cells, mast cells, platelets) (e.g., pancreatitis, operative stress, disseminated intravascular coagulation (DIC), neoplastic disease, pyometra, heat stroke, immune-mediated hemolytic anemia (IMHA), sepsis, angiosarcoma, gastric volvulus, ischemia-reperfusion injury, purpura, liver failure, hepatitis, pneumonia, systemic inflammatory response syndrome (SIRS), trauma, osteoarthritis, cystitis, disk disease, atopy/allergy, dermatitis, immune-mediated disease, otitis, inflammatory bowel disease, chronic pain, colitis, chronic obstructive pulmonary disease (COPD), cholecystitis, cholangitis, etc.) and the like. Advantageously, the composition of the present invention can exhibit excellent therapeutic actions on diseases, pathological conditions or symptoms associated with inflammatory cells including pancreatitis, operative stress and disseminated intravascular coagulation (DIC). Therefore, according to the other embodiment of the present invention, the composition of the present invention is provided as a composition for treatment of diseases, pathological conditions or symptoms associated with inflammatory cells, preferably pancreatitis, operative stress or disseminated intravascular coagulation (DIC).

According to one embodiment, examples of subjects to whom the composition of the present invention is applied include animals, preferably non-human animals such as mammals, birds, reptiles, amphibians and fishes, and more preferably mice, rats, rabbits, dogs, cats, pigs, cattle or horses. The above-mentioned animals may be livestock, pets, domestic animals, wild animals or racing animals. The above-mentioned subjects may be healthy individuals (healthy animals) or patients (patient animals).

The composition of the present invention can be appropriately used in combination with other pharmaceuticals or quasi-drugs that are regularly used in the art as necessary.

According to the other embodiment of the present invention, provided is a method for treating diseases, pathological conditions or symptoms associated with inflammatory cells, preferably pancreatitis, operative stress or disseminated intravascular coagulation (DIC), in a subject, the method including administering an effective dose of the anhydrous crystal to the subject. According to preferred the other embodiment of the present invention, when the subject is a healthy individual, the above-mentioned treatment method is regarded as a non-therapeutic improvement method excluding medical practice.

The effective dose and the frequency of administration of the anhydrous crystal of the present invention are not particularly limited and are appropriately determined by a person skilled in the art depending on the purity and the dosage form of the anhydrous crystal of the present invention, and the type, the nature, the sex, the age and the symptoms of the subject and the like. For example, the effective dose of the anhydrous crystal of the present invention is 0.01 to 1,000 mg/body weight kg, and preferably 0.05 to 500 mg/body weight kg. Examples of the frequency of administration include once per one to several days, once per several weeks, once per month and the like.

According to the other embodiment of the present invention, provided is use of the above-mentioned anhydrous crystal in production of a composition for pharmaceutical or veterinary medicine. According to preferred the other embodiment, provided is use of the above-mentioned anhydrous crystal in production of a composition for treatment of diseases, pathological conditions or symptoms associated with inflammatory cells, preferably pancreatitis, operative stress or disseminated intravascular coagulation (DIC).

According to the other embodiment of the present invention, provided is use of the above-mentioned anhydrous crystal as a drug for pharmaceutical or veterinary medicine. According to preferred the other embodiment, provided is use of the above-mentioned anhydrous crystal as a remedy for diseases, pathological conditions or symptoms associated with inflammatory cells, preferably pancreatitis, operative stress or disseminated intravascular coagulation (DIC).

According to the other embodiment of the present invention, provided is use of the above-mentioned anhydrous crystal for treatment of diseases, pathological conditions or symptoms associated with inflammatory cells, preferably pancreatitis, operative stress or disseminated intravascular coagulation (DIC).

According to the other embodiment of the present invention, provided is the above-mentioned anhydrous crystal for use as a drug for pharmaceutical or veterinary medicine. According to preferred the other embodiment, provided is the above-mentioned anhydrous crystal for treatment of diseases, pathological conditions or symptoms associated with inflammatory cells, preferably pancreatitis, operative stress or disseminated intravascular coagulation (DIC).

All of the above-mentioned embodiments of the treatment method, the use and the anhydrous crystal can be performed in accordance with the descriptions of the anhydrous crystal and the composition of the present invention.

EXAMPLES

Next, the present invention will be more specifically described by way of Production Examples and Test Examples of the present invention, but the technical scope of the present invention is not limited these Examples. Unless otherwise specified, all percentages and ratios used in the present invention are by mass. Unless otherwise specified, the units and the measurement methods mentioned herein are in accordance with the JIS standard.

Production Example 1 (Synthesis of Anhydrous Crystal of Monosodium N-(2-ethylsulfonylamino-5-trifluoromethyl-3-pyridyl)cyclohexane carboxamide)

In accordance with the method mentioned in Synthesis Example 5 of Patent Document 1, a monohydrous crystal of monosodium N-(2-ethylsulfonylamino-5-trifluoromethyl-3-pyridyl)cyclohexane carboxamide (hereinafter also simply referred to as monohydrous crystal) was produced. 10.0 g (23.8 mmol) of the obtained monohydrous crystal was put into a 500 mL eggplant type flask, and then 250 mL of ethanol preliminarily dried overnight over a molecular sieve 3 A (Nacalai Tesque, Inc.) in advance was added, followed by stirring to dissolving all monohydrous crystals, thus obtaining a solution.

Into the solution thus obtained, put 36.0 g of a molecular sieve 3 A, and the solution was allowed to stand overnight. Then, the molecular sieve was removed by filtration, and after nitrogen replacement in the system, ethanol was evaporated under reduced pressure with an evaporator to obtain 8.5 g (21.2 mmol) of an anhydrous crystal. When the moisture content of the anhydrous crystal thus obtained was measured with a Karl Fischer moisture meter (Hiranuma Moisture Meter AQV-2250, Hiranuma Sangyo Co., Ltd.), and the result was 274 ppm.

Production Example 2 (Synthesis of Anhydrous Crystal of Monosodium N-(2-ethylsulfonylamino-5-trifluoromethyl-3-pyridyl)cyclohexane carboxamide)

2.00 g (4.77 mmol) of a monohydrous crystal of monosodium N-(2-ethylsulfonylamino-5-trifluoromethyl-3-pyridyl)cyclohexane carboxamide produced in accordance with the method mentioned in Synthesis Example 5 of Patent Document 1 and a small amount of 1% by mass hydrous 2-propanol were added to a eggplant type flask, and the solution was warmed to 70 to 80° C. The 1% by mass hydrous 2-propanol was added portion wise while stirring, and at the time point of addition of 90 ml, all monohydrous crystals were dissolved, thus obtaining a solution. When the solution thus obtained was slowly cooled to room temperature while stirring, a crystal was precipitated. After further stirring overnight, the crystal was filtered through a Kiriyama funnel, washed with 2-propanol, air-dried, and dried under reduced pressure to obtain 1.10 g (2.74 mmol, yield of 57%) of an anhydrous crystal.

Test Example 1 (Powder X-Ray Diffraction Analysis)

Using a diffractometer (RINT1200 (Rigaku Corporation)), the patterns of the powder X-ray diffraction analysis of the anhydrous crystals obtained in Production Examples 1 and 2 and the monohydrous crystal used as a raw material in Production Example 1 were measured under the following conditions:

X-ray source: Cu—Kα
Tube voltage: 30 kV
Tube current: 30 mA
Measurement temperature: room temperature
2θ: 3° to 60°
Step angle: 0.02°

The powder X-ray diffraction diagrams of the anhydrous crystals obtained in Production Examples 1 and 2 were shown in FIG. 1 and FIG. 2, respectively.

In the powder X-ray diffraction pattern shown in FIG. 1, peaks were present at positions of 7.3, 10.9, 11.5, 14.5, 15.6, 18.3, 19.0, 19.7, 21.7, 23.7 and 33.5. The crystal face spacings (d values) obtained based on this result were 12.2, 8.1, 7.7, 6.1, 5.7, 4.8, 4.7, 4.5, 4.1 and 2.7.

In the powder X-ray diffraction pattern shown in FIG. 2, peaks were present at positions of 7.3, 10.9, 11.5, 14.5, 15.6, 18.3, 19.0, 19.7, 21.7, 23.7, 26.0, 32.3, 33.5, 34.3, 40.6 and 44.6. The crystal face spacings (d values) obtained based on this result were 12.2, 8.1, 7.7, 6.1, 5.7, 4.8, 4.7, 4.5, 4.1, 3.8, 3.4, 2.8, 2.7, 2.6, 2.2 and 2.0.

Meanwhile, the powder X-ray diffraction diagram of the monohydrous crystal was shown in FIG. 3. In the powder X-ray diffraction pattern shown in FIG. 3, peaks were present at positions of 7.5, 7.8, 8.7, 10.8, 15.2, 15.6, 16.0, 17.3, 18.6, 20.4, 21.7, 22.8, 23.4, 24.6, 28.0, 29.7, 35.4, 38.1, 38.5, 39.6 and 44.2. The crystal face spacings (d values) obtained based on this result were 11.7, 11.4, 10.2, 8.2, 5.8, 5.7, 5.5, 5.1, 4.8, 4.3, 4.1, 3.9, 3.8, 3.6, 3.2, 3.0, 2.5, 2.4, 2.34, 2.27 and 2.0.

The crystal face spacing (d value) is a value calculated from a diffraction angle, and any of the values also includes values occurred from an error range of ±0.2° in the diffraction angle.

The summary of the results on the diffraction peaks in the powder X-ray diffraction analysis obtained in Test Example 1 was as shown in Table 1.

TABLE 1

| Diffraction angle (2θ ± 0.2°) | | |
|---|---|---|
| Anhydrous crystal (Production Example 1) | Anhydrous crystal (Production Example 2) | Monohydrous crystal |
| 7.3 | 7.3 | 7.5 |
| 10.9 | 10.9 | 7.8 |
| 11.5 | 11.5 | 8.7 |
| 14.5 | 14.5 | 10.8 |
| 15.6 | 15.6 | 15.2 |
| 18.3 | 18.3 | 15.6 |
| 19.0 | 19.0 | 16.0 |
| 19.7 | 19.7 | 17.3 |
| 21.7 | 21.7 | 18.6 |

TABLE 1-continued

| Diffraction angle (2θ ± 0.2°) | | |
|---|---|---|
| Anhydrous crystal (Production Example 1) | Anhydrous crystal (Production Example 2) | Monohydrous crystal |
| 23.7 | 23.7 | 20.4 |
|  | 26.0 | 21.7 |
|  | 32.3 | 22.8 |
| 33.5 | 33.5 | 23.4 |
|  | 34.3 | 24.6 |
|  | 40.6 | 28.0 |
|  | 44.6 | 29.7 |
|  |  | 35.4 |
|  |  | 38.1 |
|  |  | 38.5 |
|  |  | 39.6 |
|  |  | 44.2 |

As shown in the above Table 1, the anhydrous crystal had at least peaks at diffraction angles (2θ±0.2°) of 7.3, 10.9, 11.5, 14.5, 15.6, 18.3, 19.0, 19.7, 21.7, 23.7 and 33.5. The peaks of the anhydrous crystal are clearly distinguished from the peaks of the monohydrous crystal.

Test Example 2 (Infrared Absorption Spectrum)

The infrared absorption spectrum of the crystal of the present invention was measured under the following conditions in accordance with the ATR method of Infrared Spectrophotometry mentioned in General Tests, Processes and Apparatus of the Japanese Pharmacopoeia, Seventeenth Edition:
Apparatus: Spectrum One (PerkinElmer, Inc.)
Measurement range: 4,000 to 400 cm$^{-1}$
The infrared absorption spectrum of the anhydrous crystal obtained in Production Example 1 was shown in FIG. 4.
Meanwhile, the infrared absorption spectrum of the monohydrous crystal was shown in FIG. 5.

TABLE 2

| Infrared absorption spectrum (cm$^{-1}$) | | | | |
|---|---|---|---|---|
| Anhydrous crystal | | | Monohydrous crystal | |
| 3,345 | 1,350 | 940 | 3,590 | 1,520 |
| 2,930 | 1,330 | 910 | 3,370 | 1,350 |
| 2,850 | 1,280 | 855 | 3,350 | 1,340 |
| 1,660 | 1,240 | 820 | 3,290 | 1,270 |
| 1,615 | 1,200 | 780 | 3,200 | 1,190 |
| 1,560 | 1,140 | 770 | 2,930 | 1,140 |
| 1,520 | 1,115 | 740 | 2,860 | 1,090 |
| 1,460 | 1,090 | 690 | 1,670 |  |
| 1,430 | 1,000 |  | 1,620 |  |

As shown in the above table, both are clearly different, and although the absorption peak derived from water of crystallization is 3,590 cm$^{-1}$ in IR of the monohydrous crystal, the absorption peak was not observed in IR of the anhydrous crystal of the present invention. IR values in the above table also include values of an error range of ±5 cm$^{-1}$.

Test Example 3 (Measurement of Powder Physical Properties)

Regarding the anhydrous crystal obtained in Production Example 1 and the monohydrous crystal as a raw material, the bulk density and the tapped density were measured with a powder tester type A.B.D-72 (TSUTSUI SCIENTIFIC INSTRUMENTS Co., Ltd.) in accordance with of Method 3 (measuring vessel) of Determination of Bulk Density and Method 3 of Determination of Tapped Density mentioned in the Japanese Pharmacopoeia, Seventeenth Edition. Specifically, regarding the bulk density, an excess of a sample was freely fallen through the apparatus into a cylindrical container (volume of 100 mL, inner diameter of 5.05 cm) until a container overflowed. Then, the edge of a spatula standing vertically in contact with the top surface of the container was moved smoothly, and an excess of the sample was carefully slashed off from the top surface of the container. The bulk density was calculated by dividing the mass (g) of the sample in the container by a volume of 100 mL. The tapped density was, specifically, measured as a density when the sample was filled in a cylindrical container (volume of 100 mL, inner diameter of 5.05 cm) in the same manner as for the bulk density measurement and was fallen using the apparatus at a rate of 100 times per 3 minutes.

The specific surface area was measured by a nitrogen adsorption method using Flow sorb II 2300 (Shimadzu Corporation). Specifically, the BET specific surface area was measured by a BET multipoint method by nitrogen adsorption under the following conditions:
Sample amount: 0.2 g
Deaeration condition: 150° C. (anhydrous), 80° C. (monohydrous)
Adsorption gas: nitrogen gas
The results are shown in Table 3.

TABLE 3

|  | Tapped density | Bulk density | Specific surface area |
|---|---|---|---|
| Anhydrous crystal | 0.367 g/mL | 0.289 g/mL | 3.38 m$^2$/g |
| Monohydrous crystal | 0.207 g/mL | 0.18 g/mL | 4.36 m$^2$/g |

Test Example 4 (DSC)

DSC was measured using a differential scanning calorimeter DSC6200 (Seiko Instruments Inc.) under the following conditions:
Sample amount: (anhydrous crystal obtained in Production Example 1) 3.30 mg, (anhydrous crystal obtained in Production Example 2) 2.870 mg, (monohydrous crystal) 3.870 mg
Container: aluminum open pan
Temperature rise rate: 5° C./min
Atmosphere gas: nitrogen gas
Gas flow rate: 60 ml/min
As a result, in the anhydrous crystal obtained in Production Example 1, an exothermic peak due to decomposition was obtained at 278.7° C. as shown in FIG. 6. In the anhydrous crystal obtained in Production Example 2, an exothermic peak due to decomposition was obtained at 290.6° C. as shown in FIG. 7. Both anhydrous crystals showed an exothermic peak due to decomposition within a range of 278 to 291° C.

Meanwhile, in the monohydrous crystal, an endothermic peak due to release of water of crystallization was obtained at 114.8° C., an exothermic peak due to phase transition was obtained at 208.8° C., and an exothermic peak due to decomposition was obtained at 282.4° C., as shown in FIG. 8.

As mentioned above, in the anhydrous crystal, no peaks other than an exothermic peak due to decomposition were present, which is clearly distinguished from the case of the monohydrous crystal.

Test Example 5 (Measurement of Particle Size and Shape Distribution) (Observation of Particle Shape by Electron Microscopy)

Micrographs of particles of the anhydrous crystal of the present invention and the monohydrous crystal were taken using scanning electron microscopy (SEM) (Hitachi, Ltd., S-3200N).

The anhydrous crystal obtained in Production Example 2 was massive as shown in the electron micrograph of FIG. 9. On the other hand, the particle of the monohydrous crystal of monosodium N-(2-ethylsulfonylamino-5-trifluoromethyl-3-pyridyl)cyclohexane carboxamide was needle like as shown in the electron micrograph of FIG. 10. In this way, the particle shapes that can be seen from both electron micrographs are clearly different.

(Measurement of Long Diameter, Short Diameter and Aspect Ratio by Particle Shape Image Analyzer)

Regarding the anhydrous crystal obtained in Production Example 1 and the monohydrous crystal as a raw material, the long diameter and the short diameter were measured using a particle shape image analyzer PITA-3 (SEISHIN ENTERPRISE Co., Ltd.), and the aspect ratio was calculated.

The longest diameter in the particle was regarded as the long diameter, and the shortest diameter in the particle was regarded as the short diameter. The aspect ratio was calculated by the following formula:

Aspect ratio=long diameter/short diameter

Specifically, measurement was performed under the following conditions:
Conditions
  Carrier liquid: n-hexane+lecithin
  Dispersion condition: ultrasonic wave for 5 minutes
  Flow rate of first carrier liquid: 500.00 μL/second
  Flow rate of second carrier liquid: 500.00 μL/second
  Flow rate of sample dispersion liquid: 0.42 μL/second
  Observation magnification: 10 times
  Light control filter: None
  Number of particles observed: 6,992 (anhydrous crystal) or 9,628 (monohydrous crystal)

The lower limit and the upper limit of the measurement results of the long diameter, the short diameter and the aspect ratio of all particles of the anhydrous crystal and the monohydrous crystal obtained are shown in Table 4. Furthermore, the results of the long diameter ($d_{50}$), the short diameter ($d_{50}$) and the aspect ratio of the particles of the anhydrous crystal and the monohydrous crystal obtained are also shown in Table 4.

TABLE 4

|  | Long diameter (μm) | Short diameter (μm) | Aspect ratio |
| --- | --- | --- | --- |
| Anhydrous crystal (Lower limit to upper limit) | 1.5 to 140.9 | 0.9 to 138.9 | 1.0 to 6.0 |
| Monohydrous crystal (Lower limit to upper limit) | 1.0 to 180.7 | 0.5 to 28.4 | 1.0 to 26.5 |
| Anhydrous crystal ($d_{50}$) | 6.09 | 3.34 | 1.82 |
| Monohydrous crystal ($d_{50}$) | 15.80 | 3.19 | 4.95 |

Text Example 6 (Measurement of Solubility)

After 10 mL of distilled water was put into 0.5 g of the anhydrous crystal obtained in Production Example 1 or the monohydrous crystal as a raw material, the solution was horizontally shaken with a shaker (manufactured by TAITEC CORPORATION, STRONG SHAKER SR-2DS) at room temperature and at a shaking speed of 150 strokes/min and a shaking width of 4 cm/stroke for 1 hour. Thereafter, a precipitate was confirmed to be remained, and centrifugation (3,000 rpm×10 minutes) was performed to take a supernatant, followed by filtration using a membrane filter to obtain a supernatant of a saturated solution.

2 mL of the supernatant of the saturated solution was weighed in a 20 mL volumetric flask to make a constant volume with a mobile phase, and this was used as a sample solution, followed by measurement of solubility under the following HPLC conditions:
  Analyzer: HPLC ACQUITY Arc system (manufactured by Waters K. K.)
  Mobile phase: acetonitrile/water/acetic acid=50/49.5/0.5, v/v
  Detector: ultraviolet spectrophotometer λ=276 nm (1 Au/V)
  Column: Nucleosil 5 $C_{18}$ (4.6 φ×250 mm) (manufactured by MACHEREY-NAGEL GmbH & Co. KG)
  Column temperature: 50° C.
  Flow rate: 1.075 ml/min
  Injection volume: 20 μL
  Measurement time: 40 minutes As a result of measurement, it was confirmed that the solubility of the monohydrous crystal was 160 mg/L and that of the anhydrous crystal was 204 mg/L. Considering the fact that usually a larger specific surface area leads to higher solubility, it is an unexpected effect that the anhydrous crystal, which is massive and has a smaller specific surface area, has higher solubility than that of the monohydrous crystal, which is needle like and has a larger specific surface area.

Test Example 7 (Dissolution Test)

To about 1 g each of the anhydrous crystal obtained in Production Example 1 and the monohydrous crystal as a raw material, a pressure of 10 t was applied for 45 seconds using a tableting machine with a diameter of 2 cm (Shimadzu Corporation pressing machine) to prepare three tablets each (the mean mass of the anhydrous crystal of 0.976 g, the mean mass of the monohydrous crystal of 0.961 g).

Using the above-mentioned tablets, in accordance with the specifications defined in the Japanese Pharmacopoeia, Seventeenth Edition, a dissolution test (paddle method) was performed using a dissolution tester (trade name Dissolution Tester NTR-6100A, manufactured by Toyama Sangyo Co., Ltd.) under the following measurement conditions:
  Test solution: ultrapure water
  Volume of test solution: 900 mL
  Paddle revolution rate: 50 rpm
  Solution temperature: 37° C.

As the above-mentioned ultrapure water, water produced with an ultrapure water production system (trade name Milli-Q) was used. The measurement of the contents of the anhydrous crystal and the monohydrous crystal in the above-mentioned dissolution test was performed in the same manner as in Test Example 6.

As a result of the test, the mean value of solubility at the time point of 30 minutes elapsed was 42.9% for the anhydrous crystal tablet and 35.8% for the monohydrous crystal tablet.

Test Example 8 (Angle of Repose)

Regarding the particles of the anhydrous crystal obtained in Production Example 1 and the monohydrous crystal, the angle of repose was measured in accordance with Angle of repose mentioned in the Japanese Pharmacopoeia, Seventeenth Edition.

As a result, the angle of repose of the particle of the anhydrous crystal was smaller than the angle of repose of the particle of the monohydrous crystal.

The invention claimed is:

1. An anhydrous crystal of monosodium N-(2-ethylsulfonylamino-5-trifluoromethyl-3-pyridyl)cyclohexane carboxamide, wherein a powder X-ray diffraction pattern of the anhydrous crystal obtained by using Cu—Kα as a radiation source at a tube voltage of 30 kV and a tube current of 30 mA comprises at least one peak at a diffraction angle of 2θ±0.2° selected from the group consisting of 11.5, 14.5, 18.3, 19.0, 19.7, 23.7, 26.0, 32.3, 33.5, 34.3, 40.6 and 44.6.

2. The anhydrous crystal according to claim 1, which has an absorption band at at least one wavelength of wavelengths 1,560±10, 1,460±10, 1,430±10, 1,240±10, 1,115±10, 1,000±10, 940±10, 910±10, 855±10, 820±10, 780±10, 770±10, 740±10 and 690±10 cm$^{-1}$ in an infrared absorption spectrum.

3. A composition, comprising the anhydrous crystal according to claim 1.

4. The composition according to claim 3, which is liquid, semisolid or solid.

5. The composition according to claim 3, which is in the form of a solid formulation selected from the group consisting of a tablet, a dust, a suppository, a capsule, a pill, a powder, a granule, a dry syrup, a powder inhalant, an orally disintegrating tablet, a sublingual tablet, a buccal tablet and a chewable agent.

6. The composition according to claim 3, which is for pharmaceutical or veterinary medicine.

7. A method for treating a mammal having pancreatitis, the method comprising administering an effective dose of the anhydrous crystal according to claim 1 to the mammal.

8. A method for producing the anhydrous crystal according to claim 1, the method comprising:
(a) a step of dissolving a monohydrate of monosodium N-(2-ethylsulfonylamino-5-trifluoromethyl-3-pyridyl) cyclohexane carboxamide in a solvent comprising one or a plurality selected from the group consisting of an alcohol, a sulfoxide, a nitrile and a ketone to obtain a solution,
(b) a step of dehydrating the solution, and
(c) a step of removing the solvent from the dehydrated solution to obtain the anhydrous crystal.

9. The method according to claim 8, wherein the alcohol is a linear or branched alcohol having 1 to 4 carbon atoms.

10. The method according to claim 8, wherein the alcohol is methanol or ethanol.

11. The method according to claim 8, wherein the alcohol is ethanol.

12. The method according to claim 8, wherein the dehydration in the step (b) is performed using a dehydrating agent.

13. The method according to claim 12, wherein the dehydrating agent is at least one selected from the group consisting of magnesium sulfate, anhydrous sodium sulfate, calcium chloride, a molecular sieve, activated alumina, silica gel, metal hydride, metal oxide and phosphorus oxide.

14. A method for producing the anhydrous crystal according to claim 1, the method comprising:
(a) a step of dissolving a monohydrate of monosodium N-(2-ethylsulfonylamino-5-trifluoromethyl-3-pyridyl) cyclohexane carboxamide in a 2-propanol-containing solvent to obtain a solution, and
(b) a step of cooling the solution to form the anhydrous crystal.

15. The method according to claim 14, wherein the 2-propanol-containing solvent includes 2-propanol in an amount ranging from 50 to 100% by mass.

16. The method according to claim 14, wherein the 2-propanol-containing solvent is at a temperature of 70° C. or higher in the step (a).

17. The method according to claim 14, wherein the solution is cooled to 30° C. or lower in the step (b).

18. The method according to claim 7, wherein the effective dose of the anhydrous crystal is 0.01 to 1,000 mg/body weight kg.

19. An anhydrous crystal of monosodium N-(2-ethylsulfonylamino-5-trifluoromethyl-3-pyridyl)cyclohexane carboxamide, which has an absorption band at at least one wavelength of wavelengths 1,560±10, 1,460±10, 1,430±10, 1,240±10, 1,115±10, 1,000±10, 940±10, 910±10, 855±10, 820±10, 780±10, 770±10, 740±10 and 690±10 cm$^{-1}$ in an infrared absorption spectrum.

* * * * *